(12) United States Patent
Park et al.

(10) Patent No.: US 11,755,086 B2
(45) Date of Patent: Sep. 12, 2023

(54) METHOD FOR KEYLESS RESET, AND ELECTRONIC DEVICE THEREFOR

(71) Applicant: SAMSUNG ELECTRONICS CO., LTD., Suwon-si (KR)

(72) Inventors: Sunghwa Park, Suwon-si (KR); Kiwook Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 17/483,423

(22) Filed: Sep. 23, 2021

(65) Prior Publication Data

US 2022/0011839 A1    Jan. 13, 2022

Related U.S. Application Data

(63) Continuation of application No. PCT/KR2020/004066, filed on Mar. 25, 2020.

(30) Foreign Application Priority Data

Mar. 29, 2019    (KR) .................. 10-2019-0037015

(51) Int. Cl.
*G06F 1/24* (2006.01)
*G06F 1/16* (2006.01)
(Continued)

(52) U.S. Cl.
CPC ............... *G06F 1/24* (2013.01); *G06F 1/163* (2013.01); *G06F 1/263* (2013.01); *G06F 1/3228* (2013.01)

(58) Field of Classification Search
CPC . G06F 1/24; G06F 1/163; G06F 1/263; G06F 1/3228
See application file for complete search history.

(56) References Cited

U.S. PATENT DOCUMENTS 8,595,552 B2    11/2013   Yamagami
10,348,113 B2    7/2019   Lin
(Continued)

FOREIGN PATENT DOCUMENTS

EP    2 860 634    4/2015
JP    2016-012199   1/2016
(Continued)

OTHER PUBLICATIONS

International Search Report for PCT/KR2020/004066 dated Jul. 17, 2020, 5 pages.
(Continued)

*Primary Examiner* — Zahid Choudhury
(74) *Attorney, Agent, or Firm* — Nixon & Vanderhye P.C.

(57) ABSTRACT

Disclosed is an electronic device comprising: a connection circuit configured to provide an electrical connection of an external power supply device; a processor electrically connected to the connection circuit; a memory operatively connected to the processor; and a reset circuit electrically connected to the connection circuit and operatively connected to the processor. The processor is configured to" transmit, to the reset circuit, an interrupt signal during a first time at least partially based on the identification of the connecting to the external power supply device through the connection circuit, and the reset circuit may be configured to: determine whether the interrupt signal is received within a second time after the connecting to the external power supply device through the connection circuit, and transmit, to the processor, a reset signal for a hardware reset of the processor based on the interrupt signal not being received within the second time.

15 Claims, 8 Drawing Sheets

(51) Int. Cl.
    *G06F 1/26*          (2006.01)
    *G06F 1/3228*     (2019.01)

(56) References Cited

U.S. PATENT DOCUMENTS

| | | | | |
|---|---|---|---|---|
| 2010/0235558 | A1* | 9/2010 | Snead | G06F 11/0793 |
| | | | | 710/267 |
| 2012/0124420 | A1 | 5/2012 | Yamagami | |
| 2012/0311310 | A1* | 12/2012 | Lin | G06F 11/0793 |
| | | | | 713/1 |
| 2014/0159783 | A1 | 6/2014 | Lin | |
| 2016/0018880 | A1* | 1/2016 | Jung | G06F 11/0757 |
| | | | | 713/323 |
| 2016/0087480 | A1* | 3/2016 | Trudeau | H02J 7/007 |
| | | | | 320/108 |
| 2018/0159345 | A1* | 6/2018 | Lin | G06F 1/24 |
| 2021/0096659 | A1* | 4/2021 | Park | G06F 3/016 |
| 2021/0160783 | A1* | 5/2021 | Park | H04W 52/0251 |

FOREIGN PATENT DOCUMENTS

| | | |
|---|---|---|
| KR | 10-0840939 | 6/2008 |
| KR | 10-2017-0072118 | 6/2017 |
| KR | 10-2018-0064264 | 6/2018 |

OTHER PUBLICATIONS

Written Opinion of the ISA for PCT/KR2020/004066 dated Jul. 17, 2020, 5 pages.
Extended Search Report dated Mar. 7, 2022 in counterpart European Patent Application No. 20784233.7.

* cited by examiner

METHOD FOR KEYLESS RESET, AND ELECTRONIC DEVICE THEREFOR

CROSS-REFERENCE TO RELATED APPLICATIONS

This application is a continuation of International Application No. PCT/KR2020/004066 designating the United States, filed on Mar. 25, 2020, in the Korean Intellectual Property Receiving Office and claiming priority to Korean Patent Application No. 10-2019-0037015, filed on Mar. 29, 2019, in the Korean Intellectual Property Office, the disclosures of which are incorporated by reference herein in their entireties.

BACKGROUND

Field

The disclosure relates to a method for keyless reset and an electronic device therefor.

Description of Related Art

Various electronic devices for reducing physical buttons therein may have been studied. For example, since the physical button requires a mounting space, the physical button may be omitted from the electronic device in order to reduce the size of the electronic device. For another example, at least one hole may be formed in a housing of the electronic device for mounting a physical button. The hole in the housing may cause deterioration in the waterproof performance of the electronic device. In order to enhance the waterproof performance of the electronic device, a physical button may be omitted from the electronic device.

In portable electronic devices, the convenience of the electronic devices may be increased by reducing the size. For example, in portable cellular phones, physical buttons may be reduced in order to decrease the size while increasing the size of the display. In wearable devices, a decrease in the size may be directly related to an improvement in user convenience.

As the physical button is omitted from the electronic device, various methods have been presented to replace the physical button input. For example, in order to replace the physical button input, the electronic device may provide a software button corresponding to the physical button to a display and receive an input to the software button based on the input to the display. When the software button is used to replace the physical button, an operating system of the electronic device has to operate normally in order to receive input through the software button.

When the operating system of the electronic device is in a malfunctioning state (e.g., down, freeze, or lockup), it is not possible for the electronic device to receive an input through the software button. The user may not reset the electronic device since there is no hardware button. In the case of battery-embedded electronic devices, the user may not reset the electronic device until the battery is discharged.

SUMMARY

Embodiments of the disclosure may provide a method and an electronic device for keyless reset.

According to an example embodiment of the present disclosure, an electronic device is provided, the electronic device including: a connection circuit configured to provide an electrical connection to an external power supply; a processor electrically connected to the connection circuit; a memory operatively connected to the processor; and a reset circuit electrically connected to the connection circuit and operatively connected to the processor. The processor may be configured to: transmit, to the reset circuit, an interrupt signal for a first time at least partially based on identification of the connection to the external power supply device through the connection circuit. The reset circuit may be configured to: determine whether the interrupt signal is received within a second time after the connection to the external power supply device through the connection circuit, and transmit, to the processor, a reset signal for a hardware reset of the processor based on the interrupt signal not being received within the second time.

According to an example embodiment of the present disclosure, a reset method for an electronic device that does not include a physical button is provided, the reset method including: identifying a connection to an external power supply device; transmitting an interrupt signal from a processor of the electronic device to a reset circuit of the electronic device based on the connection to the external power supply device being identified by the processor; determining, at the reset circuit, whether the interrupt signal is received within a first time interval after the connection to the external power supply device; and transmitting, at the reset circuit, a reset signal for a hardware reset of the processor to the processor based on the interrupt signal not being received within the first time interval.

According to various example embodiments disclosed in the present disclosure, the electronic device may be reset through a keyless reset even when the electronic device is in a malfunctioning state.

Besides, various effects may be provided that are directly or indirectly identified through the present disclosure.

BRIEF DESCRIPTION OF THE DRAWINGS

The above and other aspects, features and advantages of certain embodiments of the present disclosure will be more apparent from the following detailed description, in which.

With respect to the description of the drawings, the same or similar reference signs may be used for the same or similar elements.

DETAILED DESCRIPTION

Hereinafter, various example embodiments disclosed in the present disclosure will be described with reference to the accompanying drawings. However, this is not intended to limit the present disclosure to the specific embodiments, and it is to be construed to include various modifications, equivalents, and/or alternatives of embodiments of the present disclosure.

Figure 1:
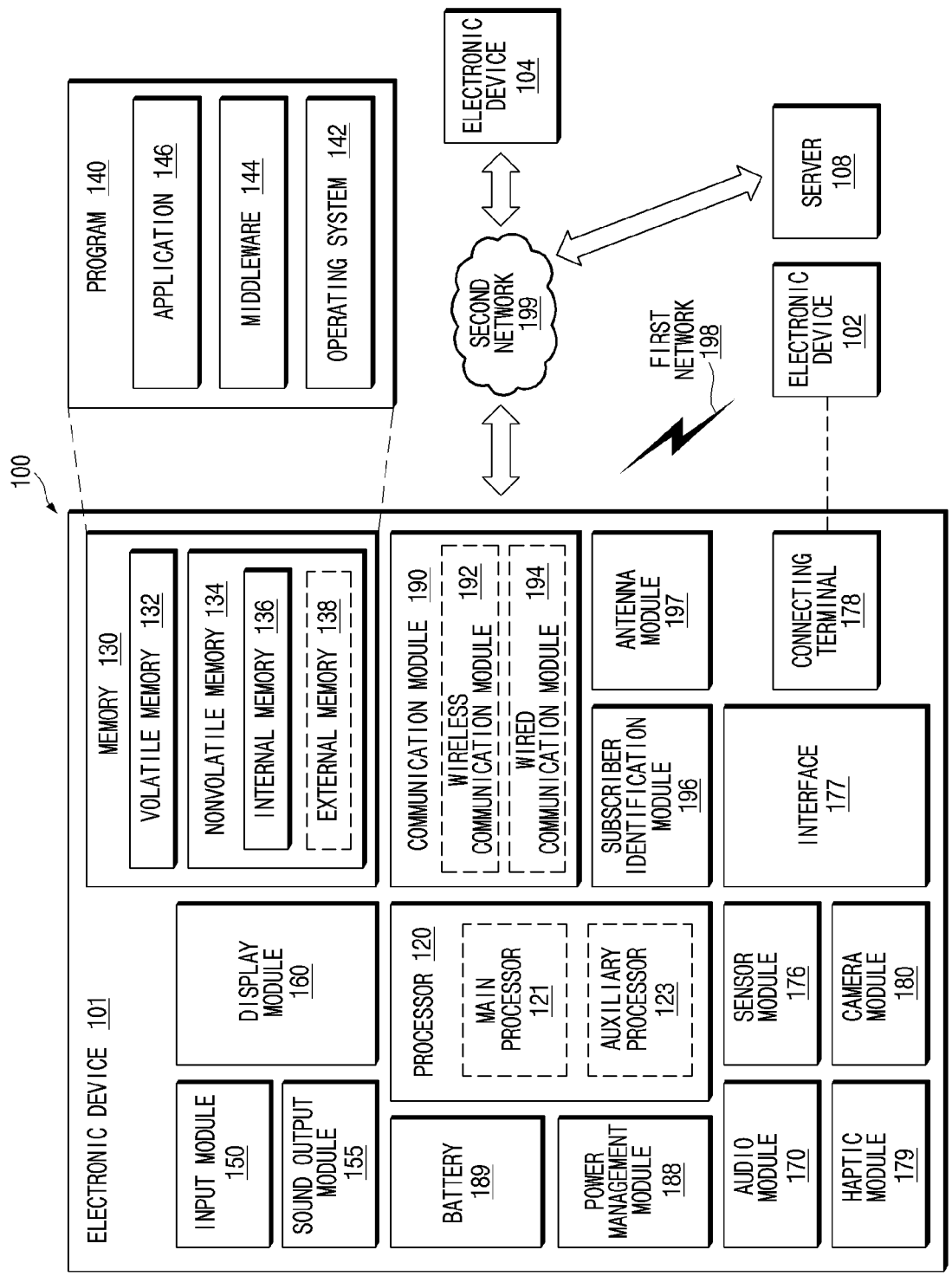
FIG. 1 is a block diagram illustrating an electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
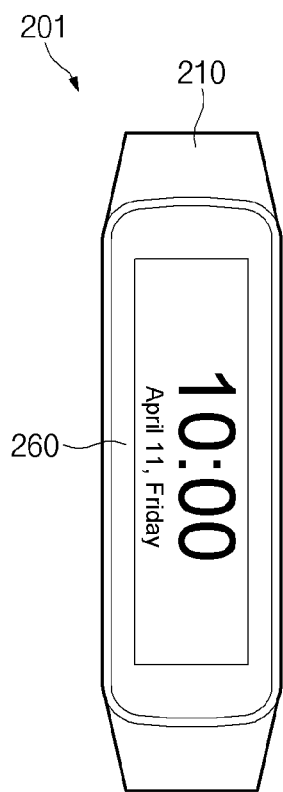
FIG. 2 is a diagram illustrating an external appearance of an example electronic device according to various embodiments.
Figure 2:
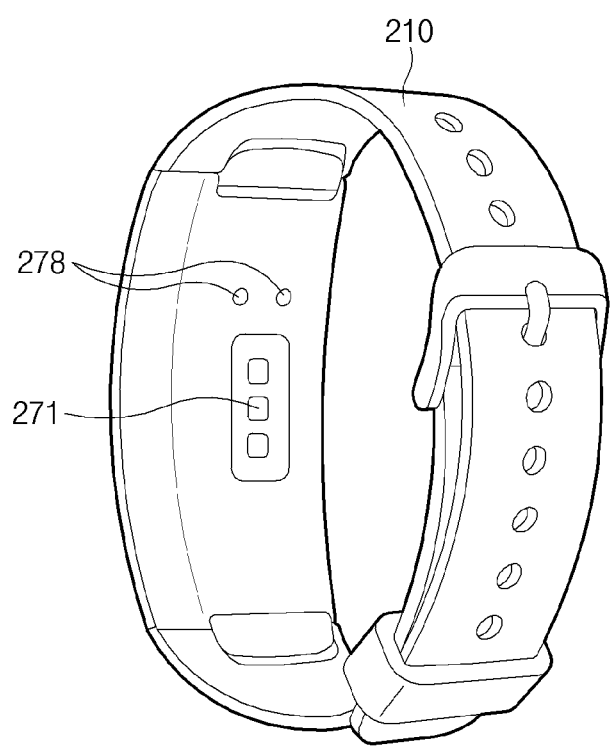

FIG. 2 is a diagram illustrating an external appearance of an example electronic device 201 according to various embodiments.

Referring to reference numeral 298, according to various embodiments, an electronic device 201 (e.g., the electronic device 101 of FIG. 1) may be a wearable device. For example, the electronic device 201 may be a wearable device mounted on a part of the user's body (e.g., a wrist, the head, an ear, or an arm). The electronic device 201 may include a band 210 for fixing the electronic device 201 to a part of the user's body.

According to an embodiment, the electronic device 201 may include a display 260 facing the first direction. For example, the electronic device 201 may display various information (e.g., a heart rate, a step number, a movement distance, and/or a time) through the display 260. For example, the display 260 may be a display that does not receive a touch input. For another example, the display 260 may be a touch display capable of receiving a touch input.

Referring to reference numeral 299, the electronic device 201 may include a second surface (e.g., a rear surface of the electronic device 201) facing a second direction opposite to the first direction. According to an embodiment, the electronic device 201 may include a biometric sensor 271 positioned on the rear surface of a housing. The electronic device 201 may detect biometric information (e.g., a heart rate, a blood pressure, a fatigue level, and/or a blood sugar level) of the user of the electronic device 201 using the biometric sensor 271. The shape of the biometric sensor 271 illustrated in FIG. 2 is merely an example, and embodiments of the present disclosure are not limited thereto. According to an embodiment, the electronic device 201 may include a connector 278 positioned on the rear surface of the housing. For example, the connector 278 may include at least one conductive portion that may be electrically connected to at least one pogo pin.

According to various embodiments, as illustrated in FIG. 2, the electronic device 201 may not include a physical button. In this case, the electronic device 201 may receive only a software input (e.g., a touch input, a voice input, and/or a physical interaction input) as a user input. For example, if the display 260 is a touch display, the electronic device 201 may receive a software input by detecting an input to the display 260. For another example, the electronic device 201 may receive a software input by detecting the voice of the user. For yet another example, the electronic device 201 may receive a software input by detecting a physical interaction (e.g., tapping) with the electronic device 201. In this case, the electronic device 201 may receive a software input by detecting a change in acceleration of the electronic device 201 due to physical interaction. For example, the software input may refer to any input that requires processing by the processor of the electronic device 201.

For example, the operating system of the electronic device 201 may enter a malfunctioning state. For example, the operating system of the electronic device 201 may enter a malfunctioning state due to a programming error, a hardware error, and/or an abnormal usage environment. In this case, the electronic device 201 may not receive a software input from the user. As described above, since the electronic device 201 does not include a physical button, the user may not reset the electronic device 201 through the physical button. According to various embodiments, the user of the electronic device 201 may perform a keyless reset on the electronic device 201 according to various methods described below with reference to the drawings.

In the examples below, the term "reset" may refer, for example, to a software reset and/or a hardware reset. For example, the software reset may refer to rebooting the operating system of the electronic device 201. For example, the hardware reset may refer to a processor reset performed through an input to a reset pin of an internal processor (not shown) of the electronic device 201. For the hardware reset, the software reset may also be performed following the hardware reset.

Figure 3:
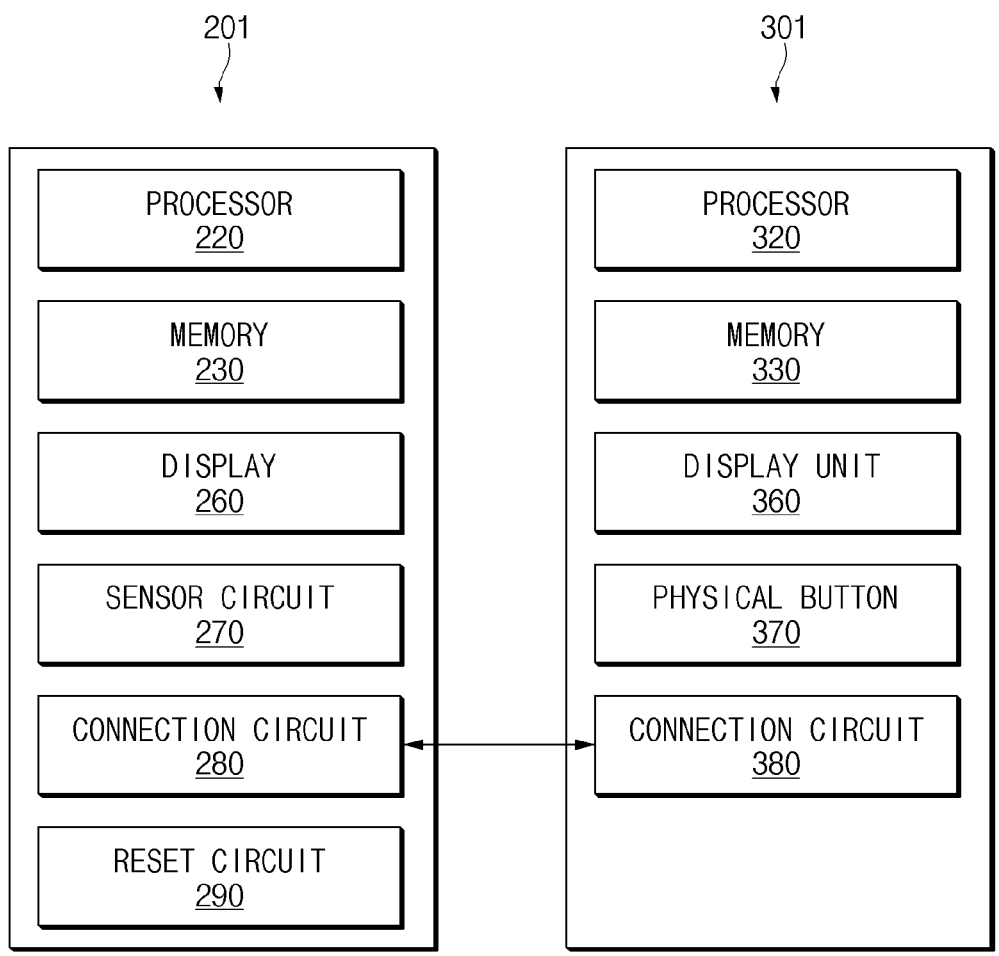
FIG. 3 is a block diagram illustrating an example configuration of the electronic device and an external power supply device according to various embodiments.

FIG. 3 is a block diagram illustrating an example configuration of the electronic device 201 and an external power supply device 301 according to various embodiments.

According to an embodiment, the electronic device 201 may include a processor (e.g., including processing circuitry) 220 (e.g., the processor 120 of FIG. 1), a memory 230 (e.g., the memory 130 of FIG. 1), a display 260 (e.g., the display device 160 of FIG. 1), a sensor circuit 270 (e.g., the sensor module 176 of FIG. 1), a connection circuit 280 (e.g., the connection terminal 178 of FIG. 1), and/or a reset circuit 290. For example, the memory 230 may be operatively connected to the processor 220 and store one or more instructions for controlling the operation of the processor 220. For example, the processor 220 (e.g., a microcontroller unit (MCU)) may be operatively connected to the memory 230, the display 260, the sensor circuit 270, the connection circuit 280, and/or the reset circuit 290. For example, the memory 230 may be embedded in the processor 220, or located outside the processor 220 to be connected to the processor 220. For example, the sensor circuit 270 may include at least one sensor. The sensor circuit 270 may include an acceleration sensor and/or a biometric sensor (e.g., the biometric sensor 271 of FIG. 2). For example, the connection circuit 280 may include a connector (e.g., the connector 278 of FIG. 2) for electrical connection to the external power supply device 301, and may be electrically connected to the processor 220 and the reset circuit 290.

According to an embodiment, the external power supply device 301 may include a processor (e.g., including processing circuitry) 320, a memory 330, a display unit (e.g., including a display) 360, a physical button 370, and/or a connection circuit 380. For example, the external power supply device 301 may be a charging device (e.g., a charging cradle) for charging the electronic device 201. For example, the processor 320 may be operatively connected to the memory 330, the display unit 360, the physical button 370, and/or the connection circuit 380. The processor 320 may control operations of the external power supply device 301 according to one or more instructions stored in the memory 330. For example, the display unit 360 may include a display including at least one light emitting diode (LED). The processor 320 may indicate the state of the external power supply device 301 using the display unit 360. For example, if an input to the physical button 370 is received, the processor 320 may change an output voltage output through the connection circuit 380 from a first voltage to a second voltage. For example, the second voltage may be lower than the first voltage. The processor 320 may maintain the output voltage as the second voltage while the input to the physical button 370 is maintained. For another example, the physical button 370 may be physically and/or electrically connected to a switch inside the external power supply device 301. For example, if the physical button 370 is pressed, the switch may be closed. For example, if the switch is closed, an additional resistor may be connected to form a voltage divider circuit. Due to the voltage divider circuit, the output voltage of the external power supply device 301 may be changed from the first voltage to the second voltage. For example, the connection circuit 380 may include at least one connection pin (e.g., a pogo pin). The connection circuit 380 may include a circuit for preventing and/or reducing overvoltage. The components of the external power supply device 301 described above are merely examples, and at least some of the above-described components (e.g., the physical button 370 and/or the display unit 360) may be omitted.

According to various embodiments, the electronic device 201 and the external power supply device 301 may be connected to each other through the connection circuit 280 and the connection circuit 380. For example, the electronic device 201 and the external power supply device 301 may comprise a charging system. According to an embodiment, if the electronic device 201 and the external power supply device 301 are connected, the electronic device 201 may receive a voltage from the external power supply device 301. For example, the electronic device 201 may receive a first voltage (e.g., a voltage equal to or higher than a first minimum voltage) from the external power supply device 301. For another example, while an input to the physical button 370 is received by the external power supply device 301, the electronic device 201 may receive a second voltage (e.g., a voltage equal to or higher than a second minimum voltage and lower than the first minimum voltage) from the external power supply device 301.

Figure 4:
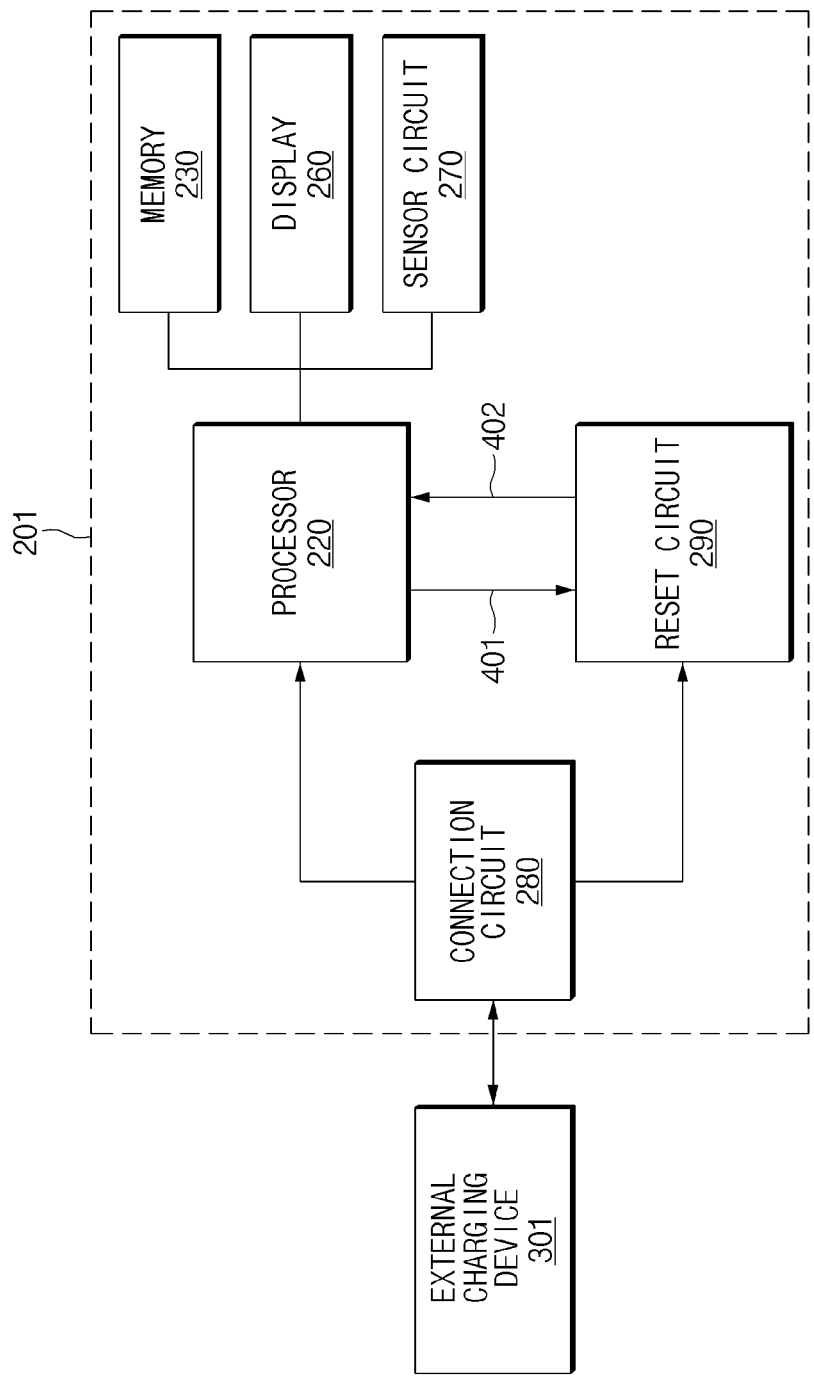
FIG. 4 is a block diagram illustrating various example components of the electronic device according to various embodiments.

FIG. 4 is a block diagram illustrating example components and an example configuration of the electronic device 201 according to various embodiments.

Referring to FIG. 4, according to various embodiments, the electronic device 201 may perform a keyless reset based on interaction with the external power supply device 301.

According to an embodiment, the electronic device 201 may perform the hardware reset based on an interrupt signal from the processor 220 to the reset circuit 290. For example, if a first voltage is received from the external power supply device 301, the processor 220 may transmit the interrupt signal to the reset circuit 290 through a first path 401 for a first time (for example, by an operating system, a driver, and/or a kernel of the electronic device 201). For example, if the reception of the first voltage from the external power supply device 301 is detected, the processor 220 may set a first timer having a length of the first time, and may transmit the interrupt signal for the first time before the expiration of the timer. The processor 220 may newly set the first timer whenever reception of the first voltage is detected. The reset circuit 290 may not perform the reset if the interrupt signal is received within a second time (e.g., a time equal to or longer than the first time) after the reception of the first voltage. For another example, if the operating system of the electronic device 201 is in a malfunctioning state (e.g., down, freezing, or lockup state), the processor 220 may not transmit the interrupt signal even if the first voltage is received. In this case, if the interrupt signal is not received within the second time, the reset circuit 290 may transmit a reset signal for a hardware reset to the processor 220 through a second path 402. If the reset signal is received, the processor 220 may perform the hardware reset. For example, the second path 402 may correspond to an electrical path between a reset pin of the processor 220 and the reset circuit 290.

According to an embodiment, the electronic device 201 may perform the hardware reset based on the magnitude of the voltage received from the external power supply device 301. For example, the connection circuit 280 may transmit a voltage received from the external power supply device 301 to the processor 220 and the reset circuit 290. The minimum operating voltage that may be recognized by the processor 220 and the reset circuit 290 may be different from each other. For example, the processor 220 may recognize a connection to the external power supply device 301 when a voltage equal to or higher than a first minimum voltage (e.g., 4.2 V) is applied. The reset circuit 290 may recognize the connection to the external power supply device 301 when a voltage equal to or higher than a second minimum voltage (e.g., 1.71 V), which is lower than the first minimum voltage, is applied. In this case, if a voltage equal to or higher than the second minimum voltage and lower than the first minimum voltage (e.g., 3.3 V or higher and 4 V or lower) is applied from the external power supply device 301, only the reset circuit 290 may recognize the connection to the external power supply device. In this case, since the processor 220 does not recognize the connection to the external power supply device 301, the processor 220 may not transmit the interrupt signal to the reset circuit 290. Since the reset circuit 290 does not receive the interrupt signal for the second time, the reset circuit 290 may transmit the reset signal to the processor 220 through the second path 402.

According to an embodiment, the electronic device 201 may perform the reset based on the number of connections to the external power supply device 301 within a specified time. For example, the processor 220 may perform the keyless reset (e.g., a software reset) if the external power supply device 301 is connected a specified first number of times (e.g., five times) or more within a third time.

Figure 5:
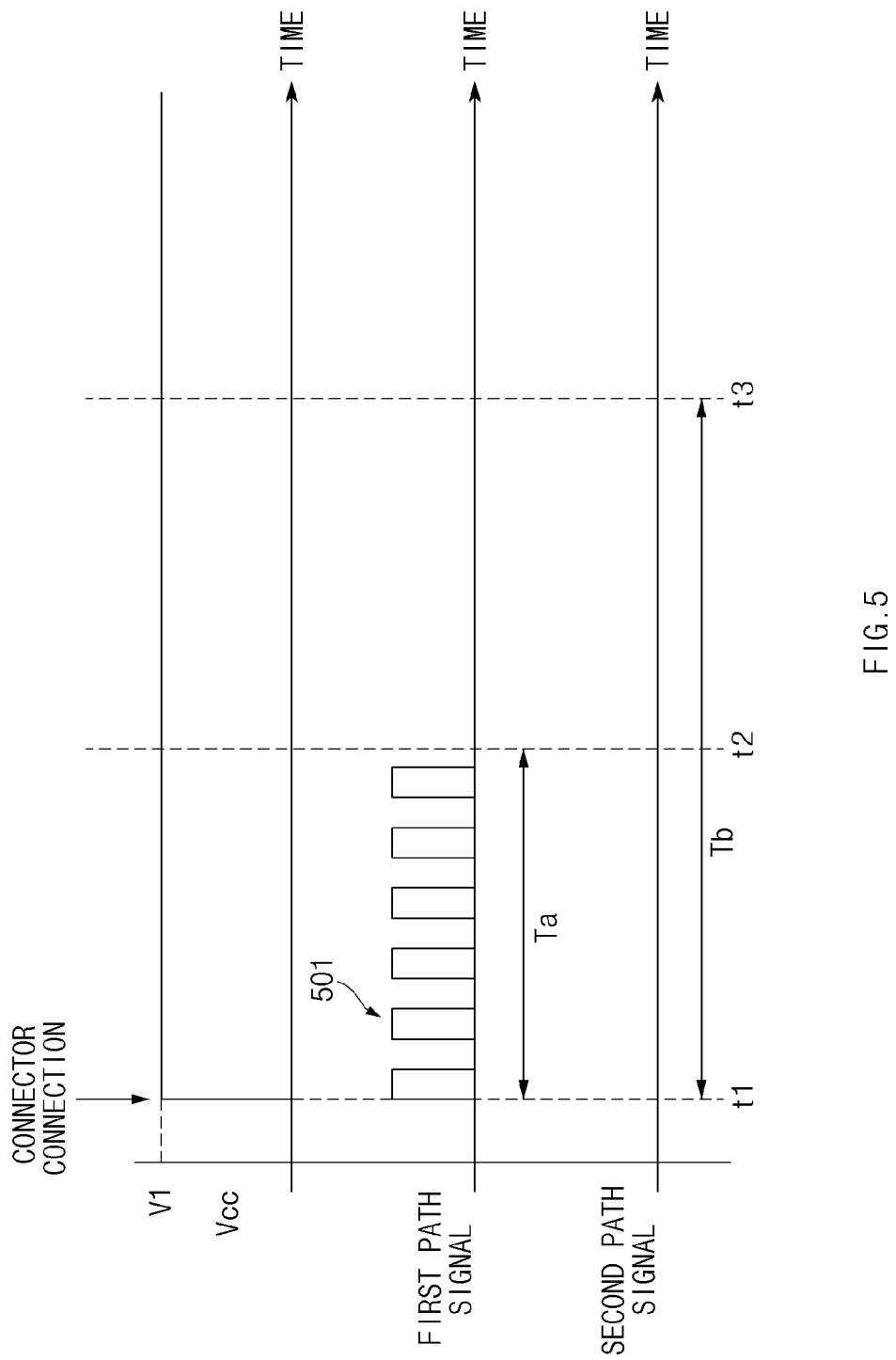
FIG. 5 is a timing diagram illustrating generation of an interrupt signal according to various embodiments.

FIG. 5 is a timing diagram illustrating generation of an interrupt signal according to various embodiments.

In the example of FIG. 5, an electronic device (e.g., the electronic device 201 of FIG. 3) and an external power supply device (e.g., the external power supply device 301 of FIG. 3) may be connected through the connector at time T1. For example, a first voltage V1 may be applied to a processor (e.g., the processor 220 of FIG. 3) and a reset circuit (e.g., the reset circuit 290 of FIG. 3) of the electronic device 201. The first voltage V1 may be, for example, a voltage equal to or higher than the first minimum voltage (e.g., 4.2 V).

According to an embodiment, if the first voltage V1 is applied, the processor 220 may transmit an interrupt signal 501 to the reset circuit 290 through a first path (e.g., the first path 401 of FIG. 4) for a first time interval Ta. For example, the operating system of the electronic device 201 may recognize the connection to the external power supply device 301 based on the first voltage V1, and if the connection to the external power supply device 301 is recognized, may transmit the interrupt signal 501 to the reset circuit 290. For example, if the first voltage V1 is recognized, the operating system of the electronic device 201 may set a timer corresponding to the first time interval Ta, and may transmit the interrupt signal 501 to the reset circuit 290 until the timer expires. In FIG. 5, the interrupt signal 501 signal has the form of a toggle signal, but embodiments of the present disclosure are not limited thereto. For another example, the interrupt signal 501 may be a signal having a value corresponding to a first logical value (e.g., 1 or 0) for the first time interval Ta.

According to an embodiment, if the first voltage V1 is applied, the reset circuit 290 may determine whether the interrupt signal 501 is received within a second time interval Tb. For example, if even one interrupt signal 501 is received within the second time interval Tb, the reset circuit 290 may determine that the interrupt signal 501 has been received. For another example, if the interrupt signal 501 is received for a specified time length or longer within the second time interval Tb, the reset circuit 290 may determine that the interrupt signal 501 has been received.

According to an embodiment, if the interrupt signal is received within the second time interval Tb, the reset circuit 290 may not transmit the reset signal to the processor 220. For example, the reset circuit 290 may ascertain that the processor 220 (or the operating system) normally operates by receiving the interrupt signal 501. In this case, the reset circuit 290 may not generate the reset (e.g., the hardware reset) of the processor 220 by not transmitting the reset signal.

Figure 6:
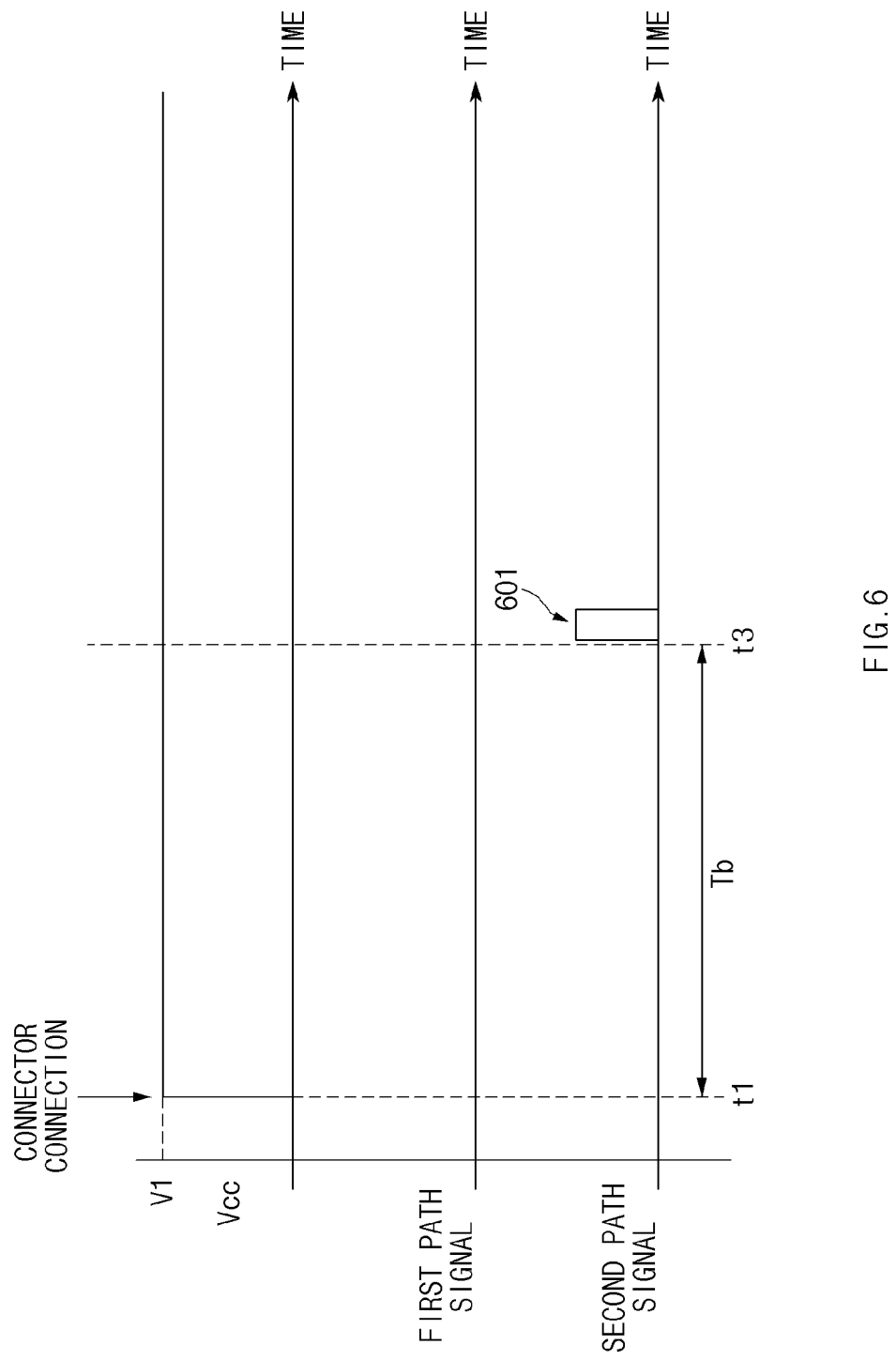
FIG. 6 is a timing diagram illustrating generation of a reset signal according to various embodiments.

FIG. 6 is a timing diagram illustrating generation of a reset signal according to various embodiments.

In the example of FIG. 6, despite the connection of the connector, a processor (e.g., the processor 220 of FIG. 3) may not transmit an interrupt signal (e.g., the interrupt signal 501 of FIG. 5) to the reset circuit (e.g., the reset circuit 290 of FIG. 3). For example, the processor 220 may detect the application of the first voltage V1 in software. In this case, if the software (e.g., the operating system or firmware) of the processor 220 is in a malfunctioning state (e.g., down, freezing, or lockup state), the processor 220 may not transmit the interrupt signal 501 to the reset circuit 290. For another example, the processor 220 may determine the transmission of the interrupt signal 501 in software. In this case, if the software (e.g., the operating system or firmware) of the processor 220 is in a malfunctioning state (e.g., down, freezing, or lockup state), the processor 220 may not transmit the interrupt signal 501 to the reset circuit 290.

In the example of FIG. 6, the reset circuit 290 may transmit the reset signal 601 to the processor 220 if the interrupt signal 501 is not received for the second time Tb. For example, the reset circuit 290 may apply the reset signal 601 to a reset pin of the processor 220. The processor 220 may perform the hardware reset if the signal is applied to the reset pin.

Figure 7:
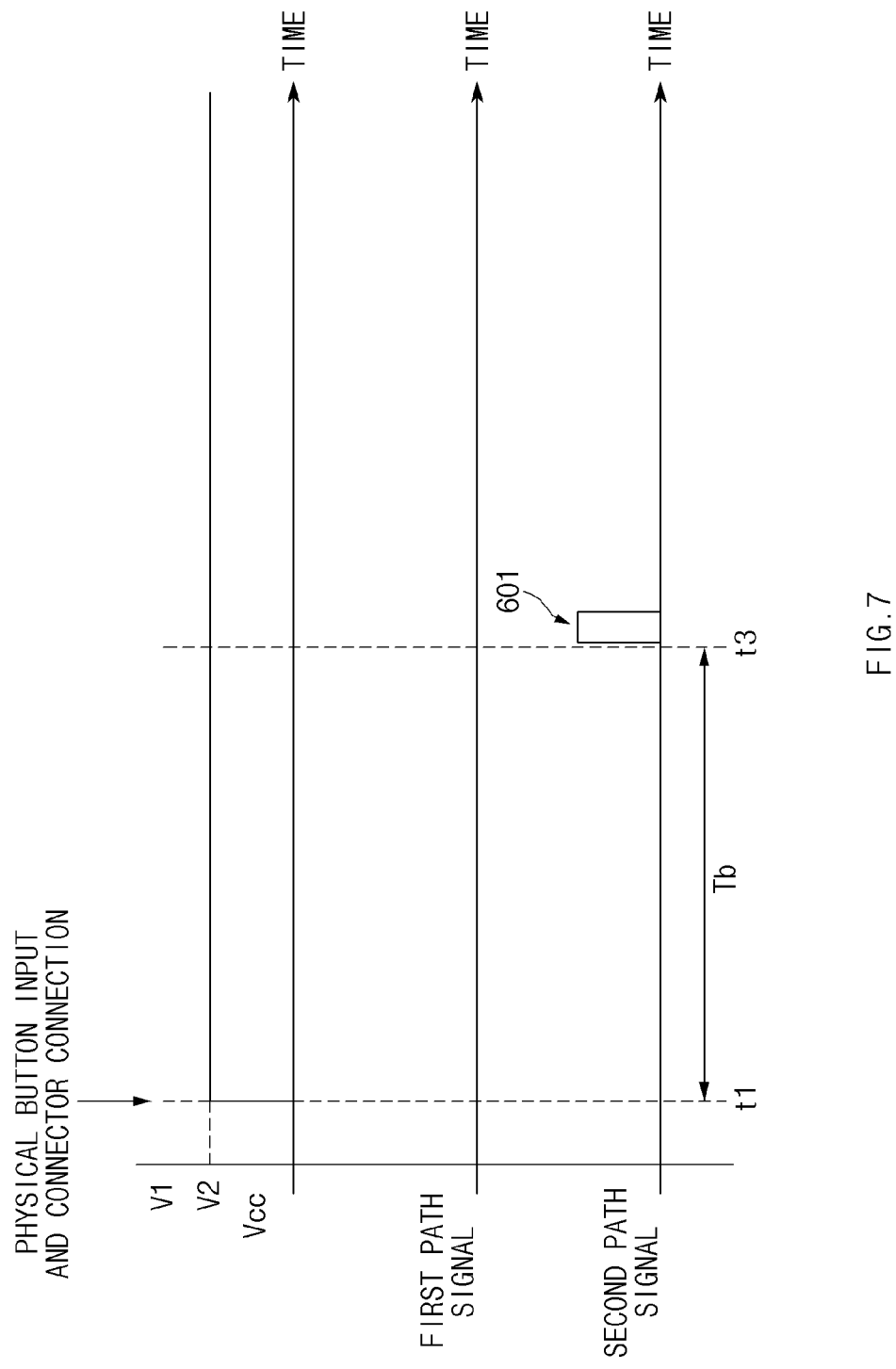
FIG. 7 is a timing diagram illustrating generation of a reset signal according to various embodiments.

FIG. 7 is a timing diagram illustrating generation of a reset signal according to an embodiment.

Referring to FIG. 7, at time t1, in a state where an input to a physical button (e.g., the physical button 370 of FIG. 3) of an external power supply device (e.g., the external power supply device 301 of FIG. 3) is maintained, the external power supply device 301 and an electronic device (e.g., the charging device 201 of FIG. 3) may be connected to each other. In this case, the external power supply device 301 may apply a second voltage V2 to the electronic device 201. A processor (e.g., the processor 220 of FIG. 2) and a reset circuit (e.g., the reset circuit 290 of FIG. 2) may also receive the second voltage V2.

According to an embodiment, the second voltage V2 may be a voltage at which the reset circuit 290 may recognize the connection to the external power supply device 301, but the processor 220 may not recognize the connection to the external power supply device 301. For example, the second voltage V2 may be lower than a first minimum voltage (e.g., 4.2 V) at which the processor 220 may recognize the connection to the external power supply device 301, and equal to or higher than a second minimum voltage (e.g., 1.7

V) at which the reset circuit 290 may recognize the connection to the external power supply device 301.

If the second voltage V2 is applied, the processor 220 may not recognize the connection to the external power supply device 301, and thus the processor 220 may not transmit the interrupt signal (e.g., the interrupt signal 501 of FIG. 5) to the reset circuit 290 regardless of (independently of) whether the processor 220 is in a malfunctioning state.

For example, if no interrupt signal is received for the second time Tb (e.g., if the physical button input is maintained for the second time Tb), the reset circuit 290 may generate the reset signal 601 after the second time Tb has elapsed.

Figure 8:
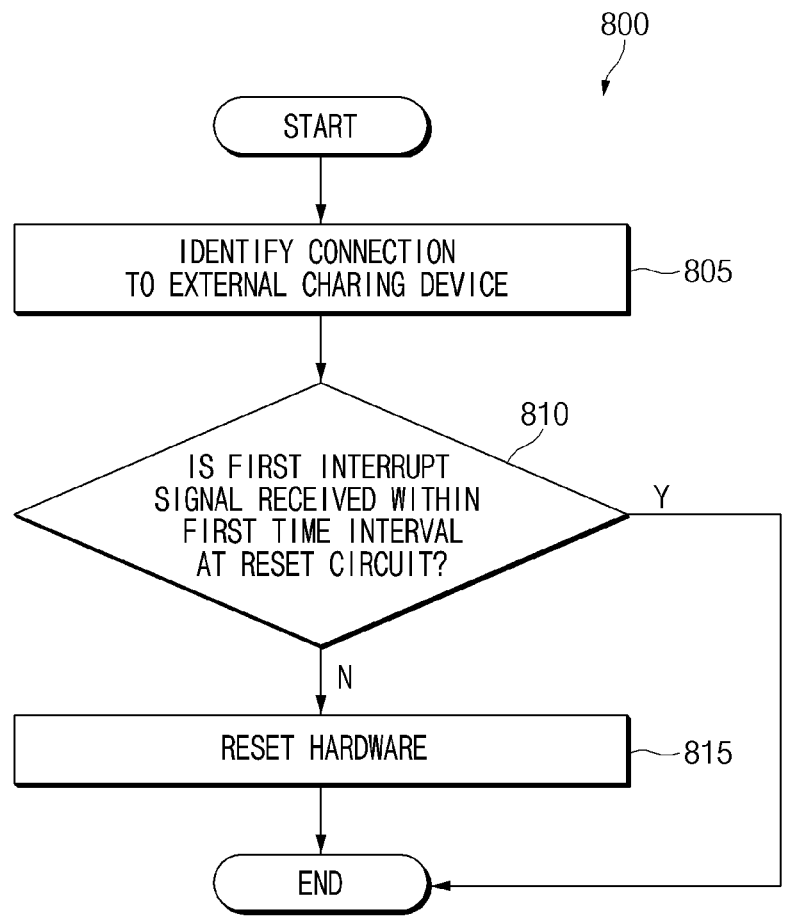
FIG. 8 is a flowchart illustrating an example reset method according to various embodiments.

FIG. 8 is a flowchart 800 illustrating an example reset method according to various embodiments.

According to various embodiments, in operation 805, an electronic device (e.g., the electronic device 201 of FIG. 3) may identify a connection to an external power supply device (e.g., the external power supply device 301 of FIG. 3). For example, a processor (e.g., the processor 220 of FIG. 3) may identify the connection to the external power supply device 301 in software. If a voltage equal to or higher than a first minimum voltage is applied from the external electronic device 301, the processor 220 may identify the connection to the external power supply device 301. For example, a reset circuit (e.g., the reset circuit 290 of FIG. 3) may identify the connection to the external power supply device 301 if a voltage equal to or higher than a second minimum voltage is applied. For example, the second minimum voltage may be a voltage less than the first minimum voltage.

According to an embodiment, if the connection to the external power supply device is identified, the processor 220 may transmit a first interrupt signal to the reset circuit 290. For example, if the connection to the external power supply device 301 is identified, the processor 220 may transmit a first interrupt signal to the reset circuit 290 for a specified first time. For example, if the connection to the external power supply device is identified, the processor 220 may set a timer corresponding to the first time, and may transmit the first interrupt signal to the reset circuit 290 until the timer expires.

For another example, if the identification of the connection to the external power supply device 301 fails, the processor 220 may not transmit the first interrupt signal. For example, the processor 220 may not identify the connection to the external power supply device 301 due to a software error (e.g., system lockup, down, or freezing). For another example, if a voltage equal to or lower than the first minimum voltage is applied from the external power supply device 301, the processor 220 may not identify the connection to the external power supply device 301.

According to various embodiments, in operation 810, the reset circuit 290 may determine whether the first interrupt signal is received within the first time interval. For example, the reset circuit 290 may determine whether at least a portion of the first interrupt signal is received within the first time interval after the connection to the external power supply device is identified.

According to various embodiments, in operation 815, the electronic device 201 may perform a hardware reset. For example, if the first interrupt signal is not received within the first time interval, the reset circuit 290 may transmit a reset signal for the hardware reset to the processor 220. The reset circuit may transmit the reset signal through a reset pin of the processor 220. The processor 220 may perform the hardware reset in response to receiving the reset signal.

For another example, if the first interrupt signal is received within the first time interval, the reset circuit 290 may not transmit the reset signal for the hardware reset to the processor 220. The processor 220 may not perform the hardware reset as the reset signal is not received.

According to various example embodiments, an electronic device (e.g., the electronic device 201 of FIG. 3) may include: a connection circuit (e.g., the connection circuit 280 of FIG. 3) providing an electrical connection to an external power supply device; a processor (the processor 220 of FIG. 3) electrically connected to the connection circuit; a memory operatively connected to the processor (the memory 230 of FIG. 3); and a reset circuit (the reset circuit 290 of FIG. 3) electrically connected to the connection circuit and operatively connected to the processor. For example, the electronic device may not include a physical button.

According to an example embodiment, the processor may be configured to transmit, to the reset circuit, an interrupt signal for a first time at least partially based on identification of the connection to the external power supply device through the connection circuit. The reset circuit may be configured to: determine whether the interrupt signal is received within a second time after the connection to the external power supply device through the connection circuit, and transmit, to the processor, a reset signal for a hardware reset of the processor based on the interrupt signal not being received within the second time.

According to an example embodiment, the reset circuit may be configured to not transmit, to the processor, the reset signal based on at least a portion of the interrupt signal being received within the second time.

According to an example embodiment, the processor may be further configured to receive the reset signal through a reset pin of the processor, and to perform a hardware reset on the processor in response to the receiving of the reset signal.

According to an example embodiment, the processor may be further configured to: identify the connection to the external power supply device based on a voltage equal to or greater than a first minimum voltage being supplied to the processor through the connection device. The reset circuit may be further configured to identify the connection to the external power supply device based on a voltage equal to or greater than a second minimum voltage being supplied to the reset circuit through the connection device. For example, the second minimum voltage may be less than the first minimum voltage.

According to an example embodiment, the processor may be further configured to perform a software reset based on a connection to the external charging device being recognized a specified number of times or more within a specified third time.

According to an example embodiment, the processor may be further configured to: set a timer of a length corresponding to a first time interval based on the connection to the external power supply device being identified and transmit the interrupt signal until the timer expires.

According to an example embodiment, the reset circuit may be further configured to, based on a voltage equal to or greater than the second minimum voltage and less than the first minimum voltage being supplied to the processor and the reset circuit through the connection circuit, monitor the interrupt signal for the second time in response to the identifying of the connection to the external power supply device, and to transmit the reset signal to the processor based on the reception of the interrupt signal failing due to non-identification of the connection to the external power supply device by the processor for the second time.

According to various example embodiments, a reset method for an electronic device that does not include a physical button may include: identifying a connection to an external power supply device; transmitting an interrupt signal from a processor of the electronic device to a reset circuit of the electronic device, based on the connection to the external power supply device being identified by the processor; determining, at the reset circuit, whether the interrupt signal is received within a first time interval after the connection to the external power supply device; and transmitting, at the reset circuit, a reset signal for a hardware reset of the processor to the processor based on the interrupt signal not being received within the first time interval.

According to an example embodiment, the reset method may further include not transmitting, at the reset circuit, the reset signal to the processor based on at least a portion of the interrupt signal being received within the first time interval.

According to an example embodiment, the reset method may further include performing, at the processor, a hardware reset on the processor based on the reset signal being received through a reset pin of the processor.

According to an example embodiment, the identifying of the connection to the external power supply device may include identifying, at the processor, the connection to the external power supply device based on a voltage equal to or greater than a first minimum voltage being supplied to the processor through the connection device and identifying, at the reset circuit, the connection to the external power supply device based on a voltage equal to or greater than a second minimum voltage being supplied to the reset circuit through the connection device. For example, the second minimum voltage may be lower than the first minimum voltage.

According to an example embodiment, the reset method may include performing, at the processor, a software reset based on a connection to the external charging device being recognized a specified number of times or more within a specified third time.

According to an example embodiment, the transmitting of the interrupt signal from the processor to the reset circuit of the electronic device may include setting, at the processor, a timer having a length corresponding to a first time interval based on the connection to the external power supply device being identified, and transmitting the interrupt signal until the timer expires.

According to an example embodiment, the reset method may further include monitoring, at the reset circuit, the interrupt signal for the second time in response to the identifying of the connection to the external power supply device, based on a voltage equal to or greater than the second minimum voltage and less than the first minimum voltage being supplied to the processor and the reset circuit through the connection circuit, and transmitting the reset signal to the processor based on the reception of the interrupt signal failing due to non-identification of the connection to the external power supply device by the processor for the second time.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
a connection circuit configured to provide an electrical connection to an external power supply device;
a processor electrically connected to the connection circuit;
a memory operatively connected to the processor; and
a reset circuit electrically connected to the connection circuit and operatively connected to the processor,
wherein the processor is configured to:
identify a connection to an external power supply based on receiving a voltage through the connection circuit; and
transmit, to the reset circuit, an interrupt signal for a first time interval at least partially based on the identification of the connection to the external power supply device through the connection circuit, and
the reset circuit is configured to:
determine whether the interrupt signal is received from the processor within a second time interval after the connection to the external power supply device through the connection circuit, wherein the second time interval is equal to or longer than the first time interval; and
transmit, to the processor, a reset signal for a hardware reset of the processor based on the interrupt signal not being received within the second time interval from the processor.

2. The electronic device of claim 1, wherein the reset circuit is configured to not transmit, to the processor, the reset signal based on at least a portion of the interrupt signal being received within the second time interval.

3. The electronic device of claim 1, wherein the processor is further configured to receive the reset signal through a reset pin of the processor, and to perform a hardware reset on the processor in response to the receiving of the reset signal.

4. The electronic device of claim 1, wherein the processor is further configured to identify the connection to the external power supply device based on a voltage equal to or greater than a first minimum voltage being supplied to the processor through the connection circuit,
the reset circuit is further configured to identify the connection to the external power supply device based on a voltage equal to or greater than a second minimum voltage being supplied to the reset circuit through the connection circuit, and
the second minimum voltage is less than the first minimum voltage.

5. The electronic device of claim 4, wherein the processor is further configured to perform a software reset based on a connection to the external charging device being recognized a specified number of times or more within a specified third time.

6. The electronic device of claim 4, wherein the processor is further configured to set a timer having a length corresponding to the first time interval based on the connection to the external power supply device being identified and to transmit the interrupt signal until the timer expires.

7. The electronic device of claim 4, wherein the reset circuit is further configured to, based on a voltage equal to or greater than the second minimum voltage and less than the first minimum voltage being supplied to the processor and the reset circuit through the connection circuit:
monitor the interrupt signal for the second time interval in response to the identifying of the connection to the external power supply device; and transmit the reset signal to the processor based on the reception of the interrupt signal failing due to non-identification of the connection to the external power supply device by the processor for the second time.

8. The electronic device of claim 1, wherein the electronic device does not include a physical button.

9. A method for resetting an electronic device that does not include a physical button, the method comprising:
    identifying a connection to an external power supply device based on receiving a voltage through the external power supply;
    transmitting an interrupt signal for a first time interval from a processor of the electronic device to a reset circuit of the electronic device, based on the connection to the external power supply device being identified by the processor;
    determining, at the reset circuit, whether the interrupt signal is received from the processor within a second time interval after the connection to the external power supply device, wherein the second time interval is equal to or longer than the first time interval; and
    transmitting, at the reset circuit, a reset signal for a hardware reset of the processor to the processor based on the interrupt signal not being received within the second time interval from the processor.

10. The method of claim 9, further comprising not transmitting, at the reset circuit, the reset signal to the processor based on at least a portion of the interrupt signal being received within the second time interval.

11. The method of claim 9, further comprising performing, at the processor, a hardware reset on the processor based on the reset signal being received through a reset pin of the processor.

12. The method of claim 9, wherein the identifying of the connection to the external power supply device includes:
    identifying, at the processor, the connection to the external power supply device based on a voltage equal to or greater than a first minimum voltage being supplied to the processor through a connection circuit; and
    identifying, at the reset circuit, the connection to the external power supply device based on a voltage equal to or greater than a second minimum voltage being supplied to the reset circuit through the connection circuit, and
    wherein the second minimum voltage is less than the first minimum voltage.

13. The method of claim 12, further comprising performing, at the processor, a software reset based on a connection to the external charging device being recognized a specified number of times or more within a specified third time.

14. The method of claim 12, wherein the transmitting of the interrupt signal from the processor to the reset circuit of the electronic device includes:
    setting, at the processor, a timer having a length corresponding to the first time interval based on the connection to the external power supply device being identified; and
    transmitting the interrupt signal until the timer expires.

15. The method of claim 12, further comprising:
    monitoring, at the reset circuit, the interrupt signal for the second time interval in response to the identifying of the connection to the external power supply device, based on a voltage equal to or greater than the second minimum voltage and less than the first minimum voltage being supplied to the processor and the reset circuit through the connection circuit; and
    transmitting the reset signal to the processor based on the reception of the interrupt signal failing due to non-identification of the connection to the external power supply device by the processor for the second time interval.

* * * * *